United States Patent [19]

Gertel

[11] Patent Number: 5,424,863
[45] Date of Patent: Jun. 13, 1995

[54] DUAL-POLARIZATION FIBER OPTIC COMMUNICATIONS LINK

[75] Inventor: Eitan Gertel, Lansdale, Pa.
[73] Assignee: AEL Industries, Inc., Lansdale, Pa.
[21] Appl. No.: 125,879
[22] Filed: Sep. 23, 1993
[51] Int. Cl.$^6$ .............................. H04B 10/00
[52] U.S. Cl. ........................ 359/173; 359/181; 359/187; 359/188
[58] Field of Search ............... 359/173, 156, 180, 181, 359/183, 189, 190, 187, 188

[56] References Cited

U.S. PATENT DOCUMENTS

| 3,752,992 | 8/1973 | Fluhr | 359/183 |
| 4,893,352 | 1/1990 | Welford | 359/156 |

FOREIGN PATENT DOCUMENTS

| 0212931 | 9/1986 | Japan | 359/183 |
| 0212932 | 9/1986 | Japan | 359/183 |
| 0018526 | 1/1990 | Japan | 359/183 |

Primary Examiner—Richard E. Chilcot, Jr.
Assistant Examiner—Richard A. Moller
Attorney, Agent, or Firm—Seidel, Gonda, Lavorgna & Monaco

[57] ABSTRACT

A dual-polarization fiber optic communications link comprising a dual polarization light source for emitting a monochromatic lightwave having two polarizations, a polarization splitting coupler for separating the polarizations of the lightwave into a carrier signal and a standard signal, an optical modulator employing the carrier signal and an information signal to produce a double-sideband suppressed carrier signal with the polarization of the carrier, an optical signal combiner for combining the double-sideband suppressed carrier having one polarization with the lightwave standard having a different polarization, said combination occurring substantially without interaction between the respective signals, and the combined signals being coupled to a fiber optic transmission medium. The communications link permits greater modulation dynamic range than conventional amplitude-modulated optical communications links.

7 Claims, 1 Drawing Sheet

DUAL-POLARIZATION FIBER OPTIC COMMUNICATIONS LINK

FIELD OF THE INVENTION

The present invention relates to the field of fiber optic communications systems. The invention provides a high dynamic range communications link through a fiber optic medium that is applicable to systems requiring high quality, low noise, broad bandwidth signal transmission, such as high speed digital data communications networks.

BACKGROUND OF THE INVENTION

Fiber optic communications links carry information signals on a laser-generated lightwave carrier. Most fiber optic communications systems until recently have employed direct modulation techniques to mix tile lightwave carrier and the information signals. The lightwave carrier is typically produced by a semiconductor laser biased at a point above that required to cause the device to emit laser light. The direct modulation technique uses the information signal, commonly though not necessarily a radio frequency signal, injected at the bias point of the semiconductor laser to vary the current that drives the laser, thus modulating the intensity of the laser signal. The output of the laser varies with the fluctuations of the information signal. These fluctuations are detected by a photodetector device at the receiver to reproduce the information signal.

However, there are disadvantages associated with direct laser modulation. The laser lightwave carrier is amplitude modulated by the information signal, producing a double-sideband signal with a large carrier component. The large amount of transmitted power in the carrier component produces a large DC output at the detector, limiting the dynamic range of the link. The laser, being a non-linear semiconductor device, can "chirp," emitting a sudden amplitude spike or trough impulse when the bias current is rapidly varied about its selected bias point. Direct modulation also increases noise in the signal and produces significant high order distortion products.

The advent of electro-optical modulators has permitted system designers to employ fixed-bias, constant output laser sources to generate the lightwave carrier. The constant lightwave carrier and the information signals are separately supplied to the electro-optical modulator. The modulator impresses the information signal on the carrier by using the information signal to electro-optically affect the passage of the lightwave carrier through a waveguide.

The modulated signal produced by electro-optical modulation is generally superior to that resulting from direct laser modulation. It is not subject to "chirp" because the laser bias point is constant. High order distortion is less pronounced. System noise is reduced. The dynamic range limitation of amplitude modulated signals remains, however, a result of the carrier component in the modulated signal.

In order to increase the dynamic range of the system, the carrier component inherent in the amplitude modulation of the lightwave carrier must be removed. Such systems are referred to as suppressed-carrier systems. With the carrier removed, substantially all the transmitted signal power is located in the information-bearing upper and lower sidebands. The DC component in the modulation product is removed, extending the potential dynamic range of the link.

The price of removing the carrier component before transmission is the necessity of providing a laser frequency standard at the receiver to demodulate the signal. Usually the carrier component is reintroduced at the receiver by means of a local laser operating at the same wavelength (frequency) as the source.

However, the necessity of providing a local laser standard at the receiver can be eliminated by transmitting the carrier along with, but separate from the transmitted suppressed-carrier modulated signal. This must be accomplished without interaction or mixing between the carrier and the modulated signal. The simultaneous transmission of the suppressed carrier modulated signal and its carrier without interaction is possible if these two signals have different optical polarizations.

SUMMARY OF THE INVENTION

The present invention is a dual-polarization fiber optic communications link comprising a dual-polarized, single-frequency laser source emitting a laser lightwave with components having two polarizations. The source comprises input to a polarization splitting coupler for separating the dual-polarized source lightwave into a carrier signal and a standard signal, each retaining their respective polarizations. The polarized carrier signal is an input to an optical modulator. In the modulator, the polarized carrier is mixed with an information signal. The signal produced is a double-sideband suppressed carrier modulated signal having the same polarization as the carrier lightwave. The laser standard signal bypasses the modulator and is combined with the double-sideband suppressed carrier signal in an optical combiner. The modulated signal and the standard combine without interference because they have different polarizations. The combination produces a dual-polarization communications link comprising a single fiber optic medium carrying the modulated signal and the standard together to detectors on the link.

The double-sideband suppressed carrier modulated signal, transmitted with the laser standard on a dual-polarization link, is easily demodulated at the receiver provided the standard has a wavelength equal to that of the carrier of the modulated signal. A photodiode detector is illuminated by both the standard and the information sidebands, mixing them. This homodyne receiver, so-called because the conversion from modulated signal back to information signal does not have an intermediate frequency (if) step, produces the information signal as a direct product of the simultaneous reception of the modulated signal and the laser standard. Thus, employing the combination of differently polarized modulation and standard signals, the dynamic range of the link can be extended by removing the DC component from the modulated signal without the need for local laser standards at the receivers along the link.

The optical modulator of the invention comprises a signal divider, a Mach-Zender electro-optical modulator, a feedback-controlled phase shifter and a signal coupler. The carrier lightwave signal is divided into primary and secondary carriers. The primary carrier is modulated by the information signal in the Mach-Zender modulator, producing a double-sideband modulated signal containing a primary carrier component. The secondary carrier passes through the phase shifter where its phase is shifted to be 180 degrees out-of-phase with the primary carrier component of the modulated signal. The modulated signal is combined with the phase-shifted secondary carrier in an optical signal combiner. The 180 degree phase relation of the secondary carrier and the primary component of the modulated signal causes the primary carrier component to be suppressed in the resulting combined signal. The output of the modulator is a double-sideband suppressed carrier signal.

The optical phase shifter in the modulator is controlled by a feedback loop which monitors the amount of carrier component present in the output of the modulator. Detection of a significant carrier component present in the modulator output causes an error signal to be developed in the feedback amplifier. This signal is employed to adjust the phase shifter, and thus the phase of the secondary carrier. The continuing adjustment maintains the phase difference between the primary and secondary carriers at 180 degrees, ensuring the cancellation of the primary component in the modulation signal.

The present invention includes a method for implementing a high dynamic range dual-polarization communications link, the steps of which correspond to the operations performed by the apparatus described herein.

BRIEF DESCRIPTION OF THE DRAWINGS

For the purpose of illustrating the invention, there are shown in the drawings forms which are presently preferred, it being understood, however, that this invention is not limited to the precise arrangements and embodiments shown.

DESCRIPTION OF THE INVENTION

Figure 1:
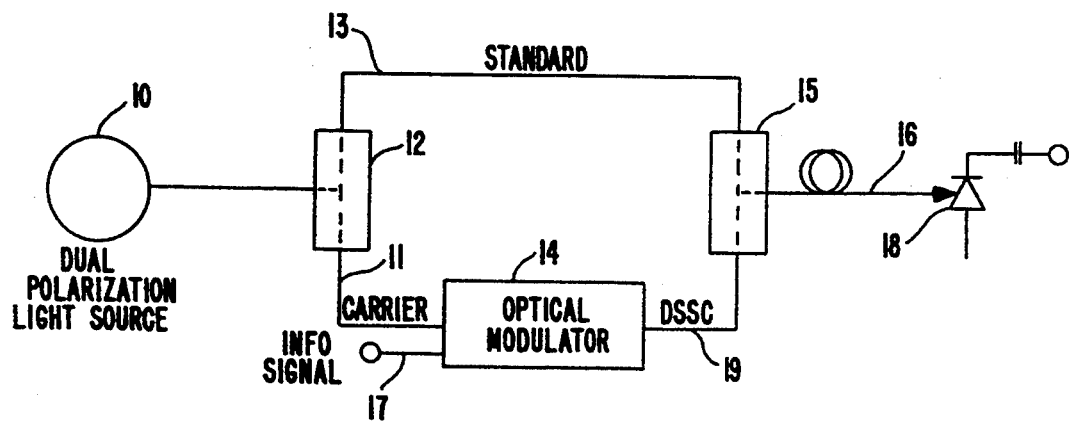
FIG. 1 is a block diagram of an apparatus embodying the present invention and incorporating the steps of the corresponding method.

Referring to FIG. 1, there is illustrated the block diagram of a dual-polarized double-sideband suppressed carrier fiber optic communications link. A dual-polarized monochromatic (single wavelength) laser source 10 provides a lightwave output for the optical link. The laser source 10 has a fixed bias, emitting a low-noise lightwave output comprising two signals of equal wavelength but having different polarizations. The dual-polarized output signal is input to a polarization splitting coupler 12. The polarization splitting coupler 12 separates the dual-polarized output from laser source 10 into two discrete lightwave signals, a carrier signal 11 and a standard signal 13, which retain their different polarizations.

The carrier signal 11 is input to a modulator 14. The modulator 14 mixes the carrier signal 11 with an information signal 17 to produce a double-sideband modulated signal. A further operation (known in the art) within the modulator 14 suppresses the carrier component of the modulated signal, leaving only information-bearing upper and lower sidebands at the output of the modulator 14. This double-sideband suppressed carrier (DSSC) modulated signal 19 is an optical signal whose polarization is the same as the polarization of the lightwave carrier which originally entered the modulator 14.

The standard signal 13, having a different polarization from the modulated signal 19, is not modulated but instead is combined with the double-sideband suppressed carrier modulated signal 19 in the optical combiner 15. The combined signals are then transmitted through an optical fiber medium 16 on a communications link. Because the two signals have different polarizations, they do not interact with each other or mix.

The combined signals propagate through the fiber optical medium 16 to the output end thereof, where they exit the medium and illuminate an optical detector 18. Common optical detectors are photosensitive semiconductor devices. Both PIN and avalanche photodiodes are used in fiber optic links, the latter offering the greater dynamic range. Unless designed to do so, these devices do not discriminate between different polarizations of light. They react to the total optical energy that impinges upon them. Thus, in the fiber optic link of the present invention, the optical detector 18 is excited by the different polarizations of the received modulated and standard signals and mixes them. When the detector 18 is illuminated by both the modulated signal and the standard simultaneously, complete demodulation takes place in the detector 18. There is no need for a local laser to generate an optical reference signal to mix with the detected optical modulated signal in order to effect demodulation. Furthermore, because the carrier component of the modulated signal was suppressed, no DC output occurs which could limit the dynamic range of the link.

Devices commonly used to perform the specific functions represented in FIG. 1 are commercially available. The critical selection criterion is the effect of the device on the polarization of the lightwave signal(s) which pass through it. For example, the polarization splitting coupler 12 must accept a dual-polarized lightwave and emit two lightwaves, each comprising only one polarization of the input lightwave. Devices employing polarization coatings or micro-optical components, made specifically for this purpose, may be employed. The optical combiner 15 is a standard symmetrical Y-coupler which may be fabricated as a coupled-fiber device or a micro-optical device, though a high quality single-mode coupled-fiber device is well-suited to the application.

The optical fiber 16 in the link must maintain the dual-polarization of the signal it carries. For short distances, a high-quality single-mode fiber may be sufficient. But over longer distances, given the imperfections which inevitably exist in any optical fiber, the two polarizations will begin to couple in a common single-mode fiber. Thus, it is necessary to employ polarization-maintaining (PM) fiber for longer optical links. These fibers are well-known in the art.

Figure 2:
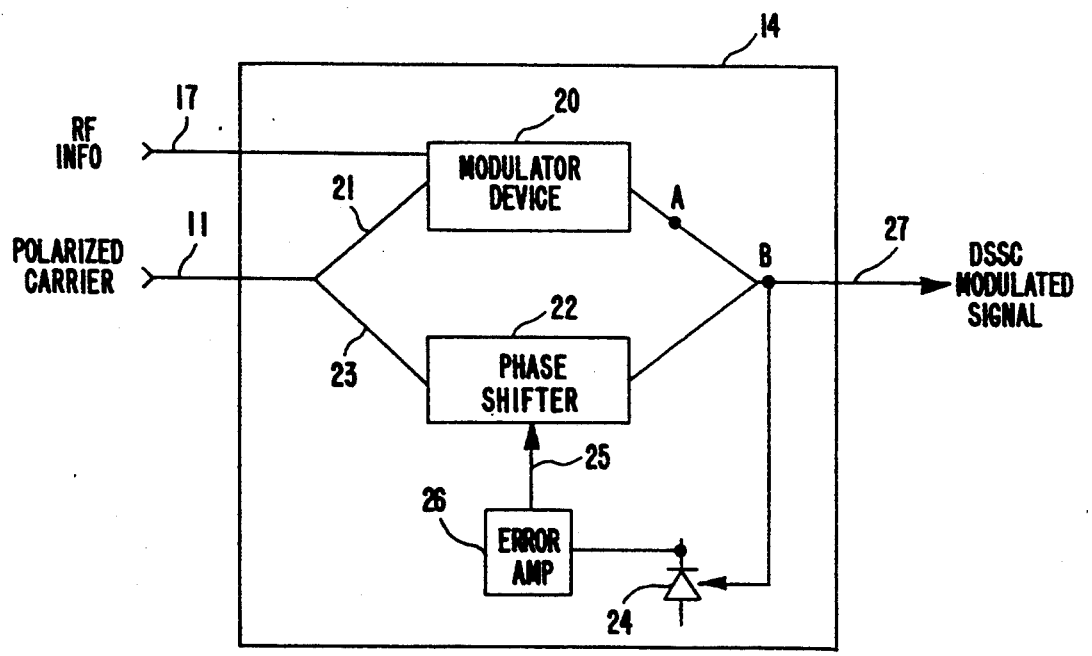
FIG. 2 is an illustration of the generation of the double-sideband suppressed carrier modulated signal.

FIG. 2 shows a detailed representation of the optical modulator 14 section of the link. The polarized carrier enters the modulator 14 and is divided into primary 21 and secondary 23 carriers. The primary carrier 21, which retains the polarization of the carrier lightwave 11, is one input into an electro-optical modulator 20. The rf information-bearing signal 17 is also supplied to the electro-optical modulator 20.

The primary carrier 21 and information 17 signals are mixed in the electro-optical modulator 20. Electro-optical modulators are familiar to those skilled in the art of fiber optical communications. They employ the Pockels effect, which induces a phase shift in the light propagating through a crystalline fiber optic waveguide when a voltage is applied across electrodes attached to the crystal. An electro-optical modulator suited to application in the present invention is a Mach-Zender interferometer intensity modulator. In the Mach-Zender intensity modulator, the primary carrier signal is divided and passed between parallel waveguides. When the information signal is applied to the electrodes associated with one waveguide a phase shift is introduced. The output signals from both waveguides are summed together, undergoing destructive interference in the process. This results in an amplitude modulated signal containing upper and lower sidebands with a carrier component.

Referring again to FIG. 2, the secondary carrier 23 is supplied to an optical phase shifter 22 that also operates by the Pockels effect. A voltage applied to an electrode on a waveguide in the phase shifter 22 alters the phase of the secondary carrier 23. The voltage is supplied by a feedback signal 25, the purpose of which is to maintain the secondary carrier 180 degrees out-of-phase with the primary carrier component from the output of the electro-optical modulator 20. The feedback signal 25 is further described below. The modulator output and the phase shifter output are combined. The 180 phase difference between the secondary carrier 23 and the primary carrier 21 results in cancellation of the primary carrier component from the modulated signal. Thus, the output of the modulator section 14 of the invention is a double-sideband suppressed carrier optical signal 27. Only the information-bearing sidebands emerge from the modulator section 14. Moreover, the DSSC optical signal 27 has the same polarization as the polarized carrier 11 which entered the modulator section 14 of the link.

Control of the phase shifter 22 in the modulator 14 is effected by diverting a small portion of the output of the modulator 14, at point B in FIG. 2, and sending it to a photodetector 24. Because any significant residual primary carrier 21 component in the modulated signal 27 produces a DC output when demodulated, the presence of unsuppressed primary carrier in the output of the modulator 14 produces an error voltage in error amplifier 26 in the feedback path. The error voltage 25 changes the bias of the electrodes in the electro-optical phase shifter 22 to compensate the phase of the secondary carrier 23 and maintain complete suppression of the primary carrier 21 in the modulator 14 output.

Using the following representations of the signals and processes of the invention, the operation of the communications link of the present invention can be illustrated.

The dual-polarized laser source output, which provides both carrier and standard lightwaves used in the invention, can be described by the notation:

$$l_c t(t) = (\cos \omega_c t + \phi)$$

Each of the polarizations of the laser source is described by the above notation.

The general expression for the output of an amplitude modulator with a carrier signal input $f_c = \sin (\omega_c t + \phi)$ and an information signal input $i_s = \sin (\omega_s t + \phi)$ is $$x(t) = (1 + \sin (\omega_s t + \phi)) \sin (\omega_c t + \phi) \qquad \text{(Eq. 1)}$$

The optical information signal i(t) supplied to the Mach-Zender modulator is represented $$i(t) = \cos (\omega_s t + \phi)$$

and is substituted for the information signal term in Equation 1. If the notation for the lightwave carrier $l_c(t)$ is substituted for the carrier term in Equation 1, then the output of the Mach-Zender modulator m(t) at the point denoted A in FIG. 2 can be represented as follows:

$$m(t) = (1 + \sin (\cos \omega_s t + \phi)) (\cos \omega_c t + \phi) \qquad \text{(Eq. 2)}$$

The "1" term in Equation 2 is a DC term which is directly related to the magnitude of the carrier (when the carrier term is distributed through the expression). If the carrier component was eliminated, the DC term would also vanish.

To eliminate the primary carrier component, the secondary carrier is phase-shifted in phase shifter 22 (see FIG. 2) to be 180 degrees out-of-phase with the primary carrier component in the modulated signal. The phase-shifted signal is represented as:

$$l_{sc}(t) = (\cos \omega_c t + (\phi + \pi))$$

where $\pi$ is the amount of the phase shift.

The combination of the modulated signal product m(t) and the phase shifted secondary carrier $l_{sc}(t)$ eliminates the carrier component in the output of the modulator. To illustrate the result, the carrier term is distributed through Equation 2, producing the expression:

$$m(t) = (\cos \omega_c t + \phi) + [\sin (\cos \omega_s t + \phi) (\cos \omega_c t + \phi]$$

where the first term is the primary carrier component (the DC term) of the modulated signal. The combination of the modulated signal m(t) with the phase shifted signal $l_{sc}(t)$ yields:

$$m(t) = (\cos \omega_c t + \phi) + [\sin (\cos \omega_s t + \phi) (\cos \omega_c t + \phi)] + (\cos \omega_c t + (\phi + \pi))$$

The first and last terms cancel each other because of the 180 degree phase difference $\pi$. What remains is the double-sideband suppressed carrier signal $$m(t) = \sin (\cos \omega_s t + \phi) (\cos \omega_c t + \phi) \qquad \text{(Eq. 3)}$$

The signal of Equation 3 is then combined with the laser standard signal having a different polarization. The standard signal, $l_c(t) = (\cos \omega_c t + \phi)$, and the double-sideband suppressed carrier signal m(t) propagate together along the fiber optic transmission medium. There is substantially no interaction between them because of their different polarizations. They do not add or mix when combined.

Referring back to FIG. 1, the two signals mix when the modulated signal and the standard reach the optical detector 18. The product of their interaction x(t) can be represented:

$$x(t) = [\sin (\cos \omega_s t + \phi) (\cos \omega_c t + \phi)](\cos \omega_c t + \phi)$$

The reduction of the above expression is shown below. First, distributing the $(\cos \omega_c t + \phi)$ term yields $$x(t) = (\cos^2 \omega_c t + \phi)[\sin (\cos \omega_s t + \phi)]$$

Substituting an identity for $\cos^2 (\omega_c t + \phi)$ produces $$x(t) = [0.5(1 + \cos 2(\omega_c t + \phi))][\sin (\cos (\omega_s t + \phi))]$$

For simplicity of notation, substitute a for $2(\omega_c t + \phi)$ and b for $\cos (\omega_s t + \phi)$:

$$x(t) = [0.5(1 + \cos a)][\sin b]$$

Distributing the sin b term produces the expression $$x(t) = 0.5(\sin b + (\sin b)(\cos a))$$

Substituting an identity for (sin b)(cos a) and proceeding algebraically yields $$x(t) = 0.5[\sin b + (0.5(\sin b - \sin a + \sin b + \sin a))]$$

$$x(t) = 0.5[\sin b + (0.5(2 \sin b))]$$

$$x(t) = 0.5 (\sin b + \sin b)$$

$$x(t) = \sin b$$

Substituting for b with $\cos(\omega_s t + \phi)$, as above, the result of mixing the modulated signal with the laser standard in the photodetector at the receiver is:

$$x(t) = \sin (\cos (\omega_s t + \phi))$$

which is a function of the original information signal and has no carrier components. Thus, the simultaneous illumination of the photodetector by the dual-polarized signals accomplishes complete demodulation of the information transmitted on the communication link. Moreover, the absence of a DC term in the demodulated signal x(t) greatly enhances the dynamic range of the link.

The present invention may be embodied in other specific forms without departing from the spirit or essential attributes thereof and, accordingly, reference should be made to the appended claims, rather than to the foregoing specification, as indicating the scope of the invention.

I claim:

1. A dual-polarization fiber optic communications link comprising:
   a dual-polarization light source for emitting a monochromatic lightwave having two different polarizations,
   a polarization splitting coupler for receiving and separating the dual-polarization lightwave into a carrier signal and a standard signal, said carrier and standard signals each having one of the two different polarizations,
   said carrier signal comprising an input to a double-sideband suppressed carrier optical modulator for mixing the carrier signal with an informational signal, to produce a modulated signal having a carrier component and information sidebands, said modulator comprising a signal splitter for dividing the carrier signal into a primary and a secondary carrier, an electro-optical modulator, and a feedback loop for controlling the phase of the secondary carrier signal in order to maintain a 180 degree phase relation to the primary carrier signal component in the modulated signal, said modulator further comprising a signal combiner for combining the modulated signal with the 180 degree phase-controlled secondary carrier signal whereby the combination of the phase-controlled carrier and the modulated signal suppresses the carrier in the modulator output, said optical modulator producing a double-sideband suppressed carrier output signal having the polarization of the carrier signal;
   an optical signal combiner for receiving the double-sideband suppressed carrier and standard signals and combining the double-sideband suppressed carrier signal with the standard signal substantially without interaction between the signals, the combined dual-polarization double-sideband suppressed carrier and standard signals being coupled to a fiber optic transmission medium for transmission to a desired location.

2. A dual-polarization fiber optic communications link comprising
   a dual-polarization light source for emitting a monochromatic lightwave having two different polarizations,
   a polarization splitting coupler for receiving and separating the dual-polarization lightwave into a carrier signal and a standard signal, said carrier and standard signals each having one of the two different polarizations,
   said carrier signal comprising an input to a double-sideband suppressed carrier optical modulator for mixing the carrier signal with an information signal, said modulator comprising an optical signal splitter for dividing the carrier signal into primary and secondary carriers, a modulator section for modulating said primary carrier with an information signal, a feedback-controlled phase shifter section for shifting the phase of the secondary carrier 180 degrees out-of-phase with the modulated primary carrier, and an optical signal combiner for combining the modulated primary carrier with the phase shifted secondary carrier, said combination producing a double-sideband suppressed carrier modulated signal having the same polarization as the carrier signal;
   the dual-polarization communications link further comprising an optical signal combiner for receiving the double-sideband suppressed carrier and standard signals and combining the double-sideband suppressed carrier signal with the standard signal substantially without interaction between the signals, the combined dual-polarization double-sideband suppressed carrier and standard signals being coupled to a fiber optical transmission medium for transmission to a desired location.

3. The dual-polarization fiber optical communications link of claim 2, the modulator section comprising an electro-optical intensity modulation device.

4. The dual-polarization fiber optical communications link of claim 2, the feedback-controlled phase shifter comprising an electro-optical phase shifter.

5. The dual-polarization fiber optical communications link of claim 2, further comprising
   a feedback control network for controlling the phase shifter section of the modulator, said feedback network comprising
   an optical detector for monitoring a small portion of the double-sideband suppressed carrier signal diverted from the link, and
   an error amplifier for conditioning an error signal emitted by the optical detector, said error amplifier emitting a control signal,
   said control signal being coupled to an electronic control input of the phase shifter.

6. A dual-polarization fiber optical communications link comprising
   a dual-polarization light source for emitting a monochromatic lightwave having two different polarizations,
   a polarization splitting coupler for receiving and separating the polarization lightwave into a carrier signal and a standard signal, said carrier and standard signals each having one of the two different polarizations, said carrier signal comprising an input to a double-sideband suppressed carrier optical modulator for mixing the carrier signal with an information signal, said modulator comprising an optical signal splitter for dividing the carrier signal into primary and secondary carriers, a modulator section for modulating said primary carrier with an information signal to produce a double-sideband modulated signal comprising an upper sideband, a lower sideband and a primary carrier component, said modulated signal having the polarization of the carrier signal;

said double sideband suppressed carrier modulator further comprising a feedback-controlled phase shifter for shifting the phase of the secondary carrier 180 degrees out-of-phase with the primary carrier component of the double-sideband modulated signal, and an optical combiner for combining the double-sideband modulated signal with the phase-shifted secondary carrier wherein the primary carrier component of the modulated signal is substantially suppressed, producing a double-sideband suppressed carrier modulated signal;

a feedback network for controlling the phase shifter, said feedback network comprising an optical detector and an error amplifier, an optical signal combiner for receiving and combining the double-sideband suppressed carrier modulated signal and the standard signal into a dual-polarization signal, the combined dual-polarization double-sideband suppressed carrier and standard signals being coupled to a fiber optical transmission medium for transmission to a desired location.

7. A method for implementing a high dynamic range fiber optical communications link comprising the steps:

connecting a dual-polarization monochromatic optical light source into a fiber optic link to generate a constant lightwave signal having two different polarizations;

separating the differently polarized signals produced by said light source into two signals, respectively a carrier and a standard signal;

modulating said carrier signal with an information signal in a double-sideband suppressed carrier optical modulator, said modulator comprising a signal divider to split the carrier signal into primary and secondary carriers, an electro-optical modulator, a feedback-controlled phase shifter for shifting the phase of the secondary carrier 180 degrees out of phase from the primary carrier, and a signal combiner, wherein the primary carrier is modulated by the information signal producing a modulated output having a large primary carrier component and information-bearing sidebands, the amplitude of the primary carrier component is measured by a detector in the feedback circuit producing a control signal that maintains the secondary carrier 180 degrees out of phase from the primary carrier component in the modulated signal, the 180 degree phase relation resulting in suppression of the carrier in the signal combiner;

combining the double-sideband suppressed carrier modulated signal with the standard signal into a dual-polarization communication signal;

and transmitting the dual-polarization communication signal through a fiber optic transmission medium.

* * * * *